May 24, 1932.  U. C. PEMBERTON ET AL  1,859,713
ARTIFICIAL BAIT
Filed May 24, 1930
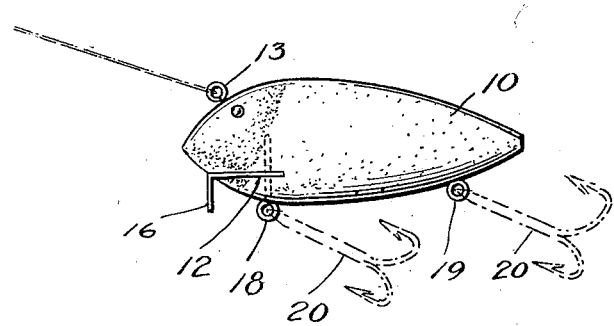
Fig. 1.
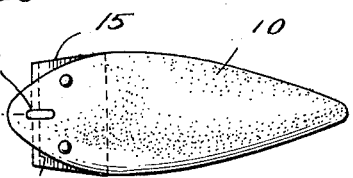
Fig. 2.  Fig. 5.  Fig. 3.
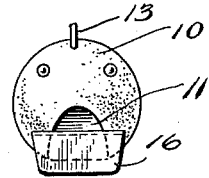
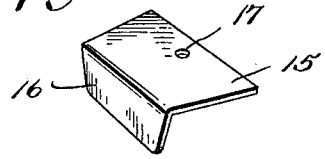
Fig. 4.
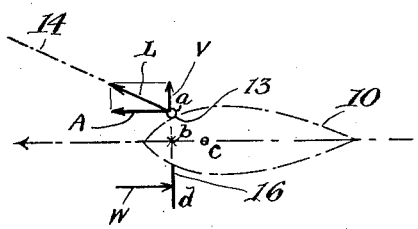
Inventors:
Uz C. Pemberton
Joseph B. Johnson
Eugene C. Brown
Attorney Patented May 24, 1932

1,859,713

UNITED STATES PATENT OFFICE

UZ C. PEMBERTON AND JOSEPH B. JOHNSON, OF TAMPA, FLORIDA

ARTIFICIAL BAIT

Application filed May 24, 1930. Serial No. 455,336.

This invention relates to an artificial bait for fish of the type termed a fish lure and which is designed to be drawn or trolled through the water.

The important objects of the present invention include the provision of a novel form of fish lure designed to simulate the darting of a small fish through the water up and down as it moves forwardly; to provide a novel form of transverse fin or mouthpiece to effect the up and down movement; and to so form and position the transverse fin or mouthpiece as to alternately permit the water to flow freely past the active portion of the fin or to resist such flow.

Attempts have been made to produce a novel lure by arranging a transverse fin or mouthpiece at the forward end of the lure which may be shifted between horizontal and vertical positions but in the form referred to, the fish line is attached to a ring or eye carried by the fin itself so that the up and down darting movement is not obtained, the effect of this fin being merely to regulate the depth at which the lure moves.

Another form of lure has been proposed which is provided with a transverse fin or mouthpiece having a vertical portion and an inclined portion arranged at an obtuse angle to this vertical portion, but this fin is neither designed for nor capable of producing any up and down darting movement. It is also to be noted that such a construction will pocket the water in the obtuse angle formed between the two portions so that the water cannot readily free itself from the fin or mouthpiece on account of this bend or angle between the parts.

With the above and other objects in view the invention will now be specifically described and claimed, reference being had to the accompanying drawings wherein;

Figure 1 is a side elevation of the improved lure.

Figure 2 is a front elevation thereof.

Figure 3 is a perspective view of the transverse fin or mouthpiece used herewith.

Fig. 4 is a diagram showing the forces acting on the lure when in horizontal position.

Figure 5 is a top plan view of the lure.

In the embodiment of the invention here shown there is provided a body 10 having the forward under portion 11 transversely flattened, as can be seen in Figure 2. A slot 12 extends rearwardly from this portion 11 and lies parallel to the longitudinal axis of the body. This slot may be termed the mouth of the lure. A line holding eye 13 is screwed or otherwise fastened in the upper front part of the body, almost directly above the forward or end opening of the slot 12. In use a line 14 is attached to this eye. A trapezoidal plate of metal of such thickness as to fit snugly in the slot is bent intermediate its ends to form a slot engaging portion 15 and a transverse fin 16 extending substantially at a right angle to the portion 15 and thus to lie perpendicular to the longitudinal axis of the body 10. Under normal conditions of flotation, the transverse fin will be vertical since the longitudinal axis will be horizontal. The fin 16 projects laterally on each side of the body at that part of the body from which it depends. The pressure of the water upon these lateral horizontal projections stabilizes the body and maintains it in an upright position as it wriggles from one side to the other. An opening 17 extends through the rear part of the portion 15 and an eye 18 extends upwardly from the bottom of the body through this opening to secure the plate in the slot 12. An eye 19 is also carried at the rear under part of the body 10 and hooks 20 may be attached directly to the eyes 18 and 19.

Referring to Figure 4 the center of gravity of the body will lie in the horizontal axis about at $c$. In drawing the body through the water a tension is exerted which is represented by the force line L, this tension being assumed to be the same in both positions shown. Likewise, movement of the fin 16 through the water is resisted by a force represented by the force line W and which is normal to the fin. This tilts the nose downwardly and causes the lure to dive. The pull on the towing line tends to reverse this movement so that the lure is kept in a constant state of change.

The horizontal pressure of the water against the fin or depending plate 16 is never balanced upon opposite sides and hence as the lure is pulled through the water the lure shifts rapidly back and forth laterally producing a life-like wriggling motion.

By placing the towing eye 13 centrally of the body and substantially in the plane of the fin 16, the vertical axis of oscillation passes through the eye and the center of the fin. This facilitates the ease of lateral shifting movement and hence enhances the rapid wriggling of the lure.

We claim:

A fish lure having a body tapering toward the longitudinal axis at each end and provided with a transverse slot located below and to the rear of the nose portion of the body and parallel to the longitudinal axis thereof, a two-plane plate bent intermediate its length to form planes at right angles, one part extending into said slot and projecting laterally upon either side of the body and the other part depending in a single plane below the body perpendicular to the longitudinal axis and a towing eye secured to the body on the central vertical longitudinal axis and substantially in the plane of said depending plate portion.

In testimony whereof we affix our signatures.

UZ C. PEMBERTON.
JOSEPH B. JOHNSON.